United States Patent
Salimi et al.

(10) Patent No.: US 12,508,743 B2
(45) Date of Patent: Dec. 30, 2025

(54) IN-MOLD SEALING SYSTEM TO ASSIST WITH VACUUM ASSISTED RESIN TRANSFER MOLDING

(71) Applicant: TPI Technology Inc., Scottsdale, AZ (US)

(72) Inventors: Amirhossein Salimi, Providence, RI (US); Alexander Segala, Rehoboth, MA (US)

(73) Assignee: TPI Technology, Inc., Scottsdale, AZ (US)

( * ) Notice: Subject to any disclaimer, the term of this patent is extended or adjusted under 35 U.S.C. 154(b) by 137 days.

(21) Appl. No.: 18/381,807

(22) Filed: Oct. 19, 2023

(65) Prior Publication Data

US 2024/0131753 A1 Apr. 25, 2024
US 2024/0227247 A9 Jul. 11, 2024

Related U.S. Application Data

(60) Provisional application No. 63/380,293, filed on Oct. 20, 2022.

(51) Int. Cl.
*B29C 33/12* (2006.01)
*B29C 33/00* (2006.01)
*B29C 70/48* (2006.01)
*B29L 31/08* (2006.01)

(52) U.S. Cl.
CPC .......... *B29C 33/0038* (2013.01); *B29C 70/48* (2013.01); *B29L 2031/085* (2013.01)

(58) Field of Classification Search
CPC . B29C 33/0038; B29C 33/0044; B29C 33/12; B29C 33/14; B23Q 3/186
See application file for complete search history.

(56) References Cited

U.S. PATENT DOCUMENTS

| | | | |
|---|---|---|---|
| 5,188,787 A | 2/1993 | King et al. | |
| 7,070,725 B2 * | 7/2006 | Mathew | B29C 45/1635 264/254 |
| 10,441,997 B2 * | 10/2019 | Stumpf | B29C 45/14065 |
| 2014/0048205 A1 * | 2/2014 | Balas | B29C 43/18 156/285 |
| 2017/0072607 A1 | 3/2017 | Ito et al. | |

(Continued)

OTHER PUBLICATIONS

International Search Report & Written Opinion for International Application No. PCT/US2023/035488 dated Jan. 31, 2024.

*Primary Examiner* — Matthew J Daniels
(74) *Attorney, Agent, or Firm* — Stephen J. Kenny; Nicole A. Bustos-Pomerantz; Foley Hoag LLP

(57) ABSTRACT

An in-mold sealing system for sealing openings in a wind turbine blade mold, the system including a wind turbine blade mold having an interior surface configured to form a surface of the wind turbine blade, the interior surface of the mold having at least one opening therein, at least one boss disposed within the at least one opening of the mold, the boss extending a distance beyond the interior surface of the mold, a flexible diaphragm having opposing first and second surfaces, with the first surface facing the mold, the flexible diaphragm disposed over the opening in the mold surface and a gasket, the gasket having a first surface coupled to a perimeter portion of the flexible diaphragm, and a second surface coupled to the interior surface of the mold, wherein the gasket circumscribes the opening.

19 Claims, 7 Drawing Sheets

(56) References Cited

U.S. PATENT DOCUMENTS

| | | |
|---|---|---|
| 2018/0147758 A1 | 5/2018 | Yasui et al. |
| 2019/0176366 A1 | 6/2019 | Tresse et al. |
| 2020/0114597 A1* | 4/2020 | Meure ................. B29B 11/16 |
| 2020/0384708 A1* | 12/2020 | Salimi ................ B29C 70/541 |

* cited by examiner

IN-MOLD SEALING SYSTEM TO ASSIST WITH VACUUM ASSISTED RESIN TRANSFER MOLDING

CROSS-REFERENCE TO RELATED APPLICATIONS

This application claims priority to U.S. Provisional Application 63/380,293, filed on Oct. 20, 2022, titled "IN-MOLD SEALING SYSTEM TO ASSIST WITH VACUUM ASSISTED RESIN TRANSFER MOLDING." The entire contents of this earlier application is hereby incorporated by reference in its entirety.

BACKGROUND OF THE DISCLOSED SUBJECT MATTER

Field of the Disclosed Subject Matter

The disclosed subject matter relates to sealing openings during the vacuum assisted resin transfer molding (VARTM) process. Particularly, the present disclosed subject matter is directed to in-mold sealing of bushing holes during the VARTM process to prevent resin leakage into those holes.

Description of Related Art

Wind Turbine blades are manufactured through Vacuum Assisted Resin Transfer Molding (VARTM), an open-top mold composite part fabricating method that attaches a vacuum bag to the top of the mold tool and applies vacuum to assist the continuous flow of low-pressure infused resin from one side of the mold to the other.

Proper tolerances in mating parts may assist in efficient VARTM processes. These cases may vary from mounting pins and studs for dry fabric, pultruded carbon planks or prefabricated parts layup to attachment of removable flange bolts to assist with blade assembly. Regardless of what the application may be, installation of a non-permanent removable feature to the surface of the mold always introduce various challenges such as vacuum leak and resin ingress.

While former issue could be addressed by consideration of proper tolerances o the mating parts as well as implementation of standard sealing systems, preventing resin ingress into the bushing holes under vacuum pressure is extremely difficult. Once entered into the cavity, resin will be cured and the connection will be no longer removable.

Thus, there remains a need for an efficient system and method for in-mold sealing during the VARTM process.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes an in-mold sealing system for sealing openings in a wind turbine blade mold, the system including a wind turbine blade mold having an interior surface configured to form a surface of the wind turbine blade, the interior surface of the mold having at least one opening therein, at least one boss disposed within the at least one opening of the mold, the boss extending a distance beyond the interior surface of the mold, a flexible diaphragm having opposing first and second surfaces, with the first surface facing the mold, the flexible diaphragm disposed over the opening in the mold surface and a gasket, the gasket having a first surface coupled to a perimeter portion of the flexible diaphragm, and a second surface coupled to the interior surface of the mold, wherein the gasket circumscribes the opening.

The disclosed subject matter also includes an in-mold sealing system for sealing openings in a wind turbine blade mold, the system including a wind turbine blade mold having an interior surface configured to form a wind turbine blade skin, the interior surface having at least one opening therein, a boss disposed within the at least one opening, a diaphragm having an internal surface configured to extend over the at least one opening and engage at least a portion of the boss, and an external surface and a perimeter portion disposed at a radial edge of the diaphragm, the perimeter portion circumscribing the opening to form a seal between the diaphragm and interior mold surface. The system including a gasket, the gasket having a first surface coupled to a perimeter portion of the flexible diaphragm, and a second surface configured to be coupled to the interior surface of the mold, wherein the gasket circumscribes the opening on the perimeter portion, the gasket configured to releasably couple the diaphragm to the mold and an outer fixture, the outer fixture having a pair of parallel legs with a interconnecting top member to define a cavity therein, the outer fixture disposed over the external surface of the diaphragm and configured to receive the boss and diaphragm within the cavity.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1:
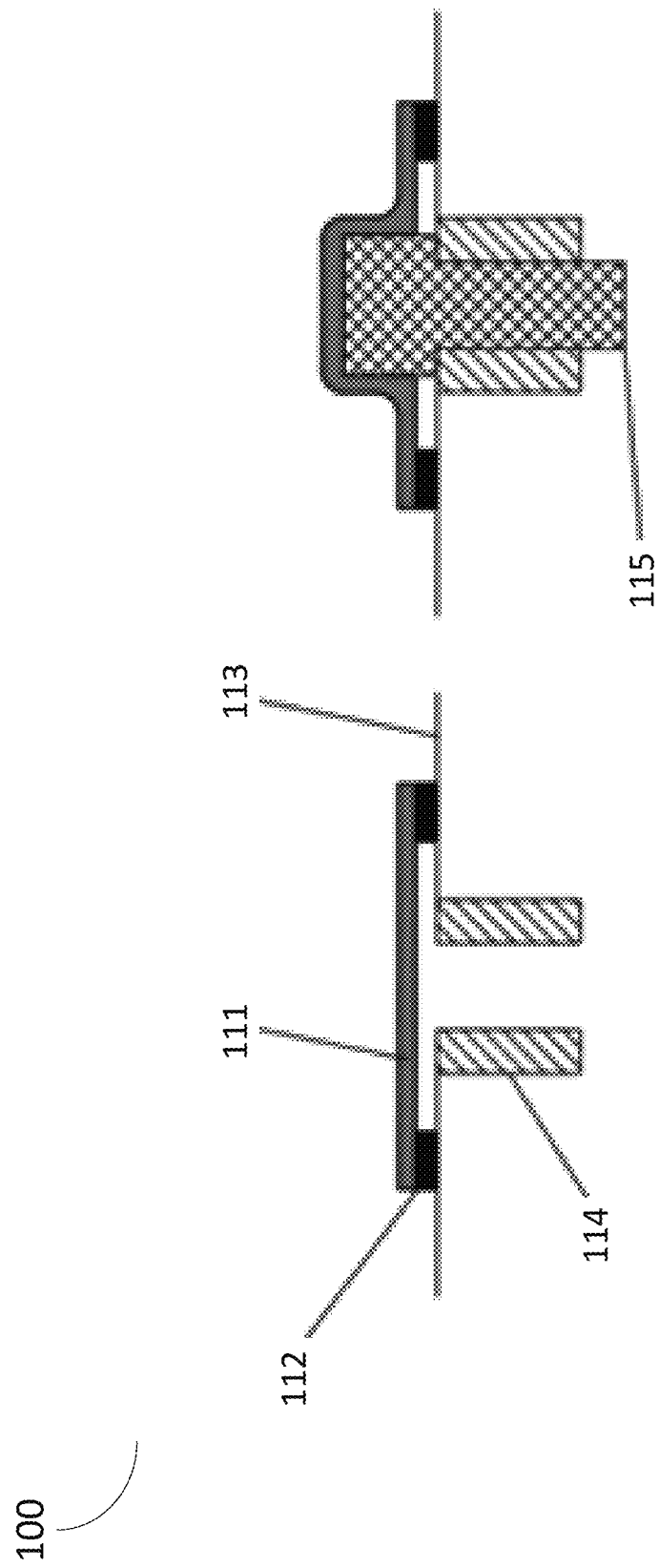
FIG. 1 is a schematic cross-sectional representation of an in-mold sealing system in accordance with the disclosed subject matter.
Figure 7:
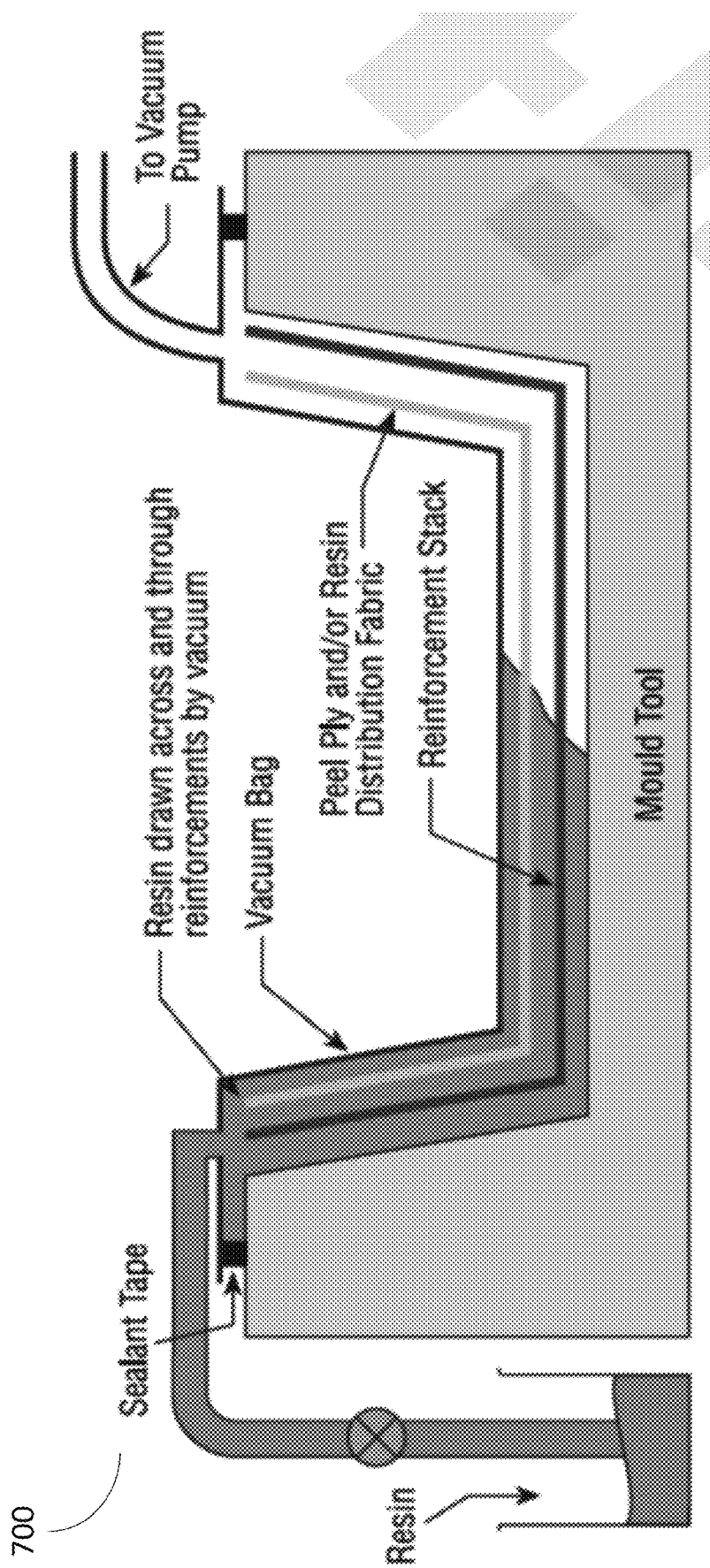
FIG. 7 is a schematic representation of a VARTM tooling and process in accordance with the present disclosure.

The methods and systems presented herein may be used for sealing openings in molds during the VARTM process 700, an example of which is shown in FIG. 7. The disclosed subject matter is particularly suited for sealing bushing holes used for temporary mold part alignment against resin ingress during the VARTM process. For purpose of explanation and illustration, and not limitation, an exemplary embodiment of the system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

As shown in FIG. 1, the in-mold sealing system 100 for bushing holes in a mold is shown in cross-sectional schematic view. In-mold sealing system 100 may be used to temporarily connect and align mating parts, such as two or more portions of a mold during VARTM processes. In-mold sealing system 100 may be an easy-to-remove system according to the description herein, namely in reference to one or more adhesives used in an adhesive gasket, in embodiments.

With continued reference to FIG. 1, system 100 includes a flexible diaphragm 111. Flexible diaphragm 111 may be formed from one or more stretchable materials. In some embodiments, flexible diaphragm 111 may be formed from one or more rubbers, such as latex. In some embodiments, flexible diaphragm 111 may be formed from one or more elastic substances that are capable of stretching and returning to their initial shape. In non-limiting embodiments, flexible diaphragm may be formed from any one or a combination of the organic compound isoprene and variations thereof, including impurities. In non-limiting embodiments, flexible diaphragm may be formed from any one or a combination of polyisoprene and/or other elastomers. In non-limiting embodiments, flexible diaphragm may be formed from any one or a combination of natural rubbers alone or in combination with synthetic rubbers. In non-limiting embodiments, flexible diaphragm may be formed from any one or a combination of synthetic rubbers alone or in combination with natural rubbers.

With continued reference to FIG. 1, flexible diaphragm 111 includes a first complementary shape corresponding to the mold, such as the mold surface 113. That is to say that the flexible diaphragm may cover bushing hole 114 in a non-planar area of mold surface 113. The first complementary shape covering the opening, and extending beyond the boundary of the hole 114 opening or "mouth", with a symmetrical (or asymmetrical) shape. Flexible diaphragm 111 is configured to stretch into a second complementary shape corresponding to the boss. For example and without limitation, flexible diaphragm 111 may include a second complementary shape configured to contact the outer mold line of the portion of boss 115, inserted within the hole 114, and extending upwardly beyond the mold surface 113, such as in FIG. 1. The second complementary shape may partially contact the boss 115, such as only stretching to contact the top most portion of boss 115 (i.e., the distal end of boss 115 relative to mold surface 113) and extending radially to adhesive gasket 112, which can be spaced from the boss 115. In the exemplary embodiment shown, the flexible diaphragm abuts the top surface of the boss 115, as well as the sidewalls thereof, so that the diaphragm has a generally U-shape configuration.

The flexible diaphragm 111 is configured to seal bushing hole 114 against resin (or other debris) ingress, so whether flexible diaphragm 111 is contacting boss 115 fully (e.g. top surface and sidewalls), or only partially (e.g. top surface only), flexible diaphragm 111 extends beyond the opening/mouth of hole 114 and remains sealed over bushing hole 114. In the exemplary embodiment shown, the diaphragm is configured to establish a seal with respect to the hole 114, but does not directly contact the mold surface 113. Instead, the gasket serves as an intermediary between the diaphragm 115 and the mold surface 113. The gasket 112 can have a greater thickness than the flexible membrane, with the outer edge of gasket 112 vertically aligned with the outer edge of the membrane 112.

Flexible diaphragm 111 includes a perimeter portion disposed at a radial edge of the flexible diaphragm, the perimeter portion disposed proximate the mold surface and surrounding the opening, such as bushing hole 114. The perimeter portion of flexible diaphragm 111 is configured to receive adhesive gasket 112. The perimeter (or portions thereof) of the mold surface surrounding the hole 114 may be treated for adhesion to adhesive gasket 112 in embodiments in which the gasket 112 is a discrete component from the diaphragm (in some embodiments, the gasket and diaphragm can be integrally formed). The perimeter portion of the gasket 112 may be thicker than a stretchable portion of flexible diaphragm 111, and/or formed from an altogether different material than the rest of flexible diaphragm 111 such as a sturdier or harder material. Perimeter portion may be treated to stretch less, therefore less likely to become dislodged from adhesive gasket 112 or mold surface 113.

Flexible diaphragm 111 may be formed from elastomers such as natural polyisoprene: cis-1, 4-polyisoprene natural rubber (NR) and trans-1,4-polyisoprene gutta-percha, Synthetic polyisoprene (IR for isoprene rubber), polybutadiene (BR for butadiene rubber), chloroprene rubber (CR), polychloroprene, neoprene, baypren etc., butyl rubber, halogenated butyl rubbers (chloro butyl rubber: CIIR; bromo butyl rubber: BIIR), styrene-butadiene rubber (copolymer of styrene and butadiene, SBR), nitrile rubber (copolymer of butadiene and acrylonitrile, NBR), hydrogenated nitrile rubbers (HNBR). In some embodiments, flexible diaphragm 111 may be formed from saturated rubbers that cannot be cured by sulfur vulcanization such as EPM (ethylene propylene rubber, a copolymer of ethene and propene) and EPDM rubber (ethylene propylene diene rubber), Epichlorohydrin rubber (ECO), Polyacrylic rubber (ACM, ABR), Silicone rubber (SI, Q, VMQ), Fluorosilicone rubber (FVMQ), Fluoroelastomers (FKM, and FEPM) Viton, Tecnoflon, Fluorel, Aflas and Dai-El, Perfluoroelastomers (FFKM) Tecnoflon PFR, Kalrez, Chemraz, Perlast, Polyether block amides (PEBA), Chlorosulfonated polyethylene (CSM), (Hypalon), Ethylene-vinyl acetate (EVA). In some embodiments, flexible diaphragm may be formed Thermoplastic elastomers (TPE).

With continued reference to FIG. 1, flexible diaphragm 111 may be configured to stretch under a plurality of thermal conditions, such as elevated temperatures on the order of hundreds or thousands of degrees Fahrenheit. Flexible diaphragm 111 may be configured to stretch under a plurality of thermal conditions such as for example below the freezing point of water. Flexible diaphragm 111 may be configured to stretch such that the thickness of the stretch diaphragm is above a certain threshold, in other words, the diaphragm is configured to stretch without entering a thickness regime wherein a feature (e.g., a boss like a pin/bolt/screw head) could puncture the diaphragm without even a sharp feature. Flexible diaphragm 111 may be configured to fail in one or more predetermined modes, such as puncture without reverting back to an unstretched state (i.e., a rapid recession of material such that the puncture expands rapidly, like a rubber balloon popping). For example and without limitation, flexible diaphragm 111 may be formed such that the material has a tendency to stretch in a first direction more easily than a second or subsequent directions, thereby strengthening the diaphragm transverse to the stretching direction.

With continued reference to FIG. 1, system 100 includes an adhesive gasket 112. Adhesive gasket 112 may be configured to adhere the flexible diaphragm 111 to at least a portion of the mold, such as mold surface 113, which will be discussed in greater detail below. Adhesive gasket may be disposed at the outermost edge of flexible diaphragm 111. For example, in some embodiments flexible diaphragm 111 may have a circular pre-stretched shape, wherein the outermost edge of one side of the flexible diaphragm 111 is fixed to a first side of adhesive gasket 112. Adhesive gasket 112 may comprise a torus shape, wherein the outer edge of adhesive gasket mirrors the outermost edge of flexible diaphragm 111 and extends a distance toward the center of flexible diaphragm 111, terminating in an inner circular planform shape with a radius smaller than the outermost edge. This is merely an example, and a plurality of adhesive gasket shapes may be utilized in system 100.

Adhesive gasket 112 is configured to sealably and releasably fix flexible diaphragm 112 to mold surface 113 over an opening such as a bushing hole 114. Adhesive gasket 112 is configured to surround at least the opening of bushing hole 114 in mold surface 113. Adhesive gasket 112 may be configured to stick to the material of mold surface 113. Adhesive gasket 112 may be formed from double-sided tape, such as sticky tack tape. Adhesive gasket may be formed from one or more rubbers suitable for gaskets configured to seal against a liquid or viscous substance (such as resin) like any of the rubbers described herein above. Adhesive gasket 112 may be formed from a material configured to stretch with flexible diaphragm 111. Adhesive gasket 112 may be formed from a material configure to resist stretching with flexible diaphragm 111. Adhesive gasket 112 may be formed from a material that is conditionally adhesive, such as after the application of heat, pressure, or another condition. Adhesive gasket 112 may be conditionally adhesive such that it may be applied and removed repetitively in one or more subsequent VARTM processes. Adhesive gasket 112 may be fixed to the perimeter portion of flexible diaphragm 111; in some embodiments the gasket 112 can be the same thickness as the diaphragm 111, whereas in other embodiments the gasket can be a different/thicker/thinner thickness than the diaphragm 111. Adhesive gasket 112 may be formed from double-sided tape. The adhesive gasket 112 is configured to releasably fix the flexible diaphragm 111 to a contoured surface of the mold. That is to say that the system 100 may be configured to be routinely removed and reapplied to mold surfaces 113 in one or more subsequent VARTM processes.

With continued reference to FIG. 1, flexible diaphragm 111 may be configured to contour to at least a portion of a mold, such as mold surface 113. Mold surface 113 may be a portion of a mold or mold part configured to mold at least a portion of a turbine blade. Mold surface may be formed from a composite, metal, or a combination thereof. Mold surface 113 may include one or more contoured surfaces meeting at one or more angles. For example mold surface 113 may include the contour of one or more airfoils, chord or span-wise. Mold surface 113 may be reconfigurable for use with more than one molded component. The adhesive gasket could be selected from wide range of material such as tacky tapes widely used in VARTM process to provide vacuum bag seal. The flexible diaphragm could be chosen of stretchable material such as latex (it is important that the chemistry of selected material does not react with infusion resin or any of the resins used in the VARTM processes). In addition, one can alternatively mold a non-stretchable material (i.e., polyurethane) to create a fixed shape diaphragm for certain applications as further detailed in the upcoming paragraphs.

Mold surface 113 includes at least an opening such as bushing hole 114. Bushing hole 114 may be disposed at a plurality of angles relative to the mold surface 113, such as at an angle other than normal or perpendicular. Bushing hole 114 includes at least a boss 115. Boss 115 may be any portion of a screw, bolt, bushing, stud, pin, nail, peg, dowel, or other feature configured to partially sit within bushing hole 114 and partially extend above mold surface 113, such as in FIG. 1. Boss 115 may be stationary, such as a bolt threaded into bushing hole 114 temporarily, the system 100 placed over it after installation.

Boss 115 may be coupled to an actuator beneath the mold surface 113 and configured to protrude through/beyond the mold surface 113 as driven by the actuator. System 100 is configured to be placed over the opening (bushing hole 114) in the mold surface 113 in the first complementary shape (i.e., the complementary shape of the mold surface 113) and stretch over a retractable pin actuated to protrude from the mold surface 113 to form the second complementary shape (i.e., the shape complementing at least a portion of boss 115, such as the head of a bolt, as in FIG. 1). In various embodiments, the system 100 may be configured for a specific pin and specific travel of said pin. For example, a pin may have a unique membrane configured to allow that specific pin to protrude through the mold at its designed distance. In various embodiments, any membrane system may be placed over any pin disposed in the mold and be configured to seal said pin from ingress of resin. The system 100 is configured to remain sealed against the mold surface 113 during the retraction of the retractable pin, wherein the flexible diaphragm is configured to revert back to the first shape from the second shape.

Figure 2:
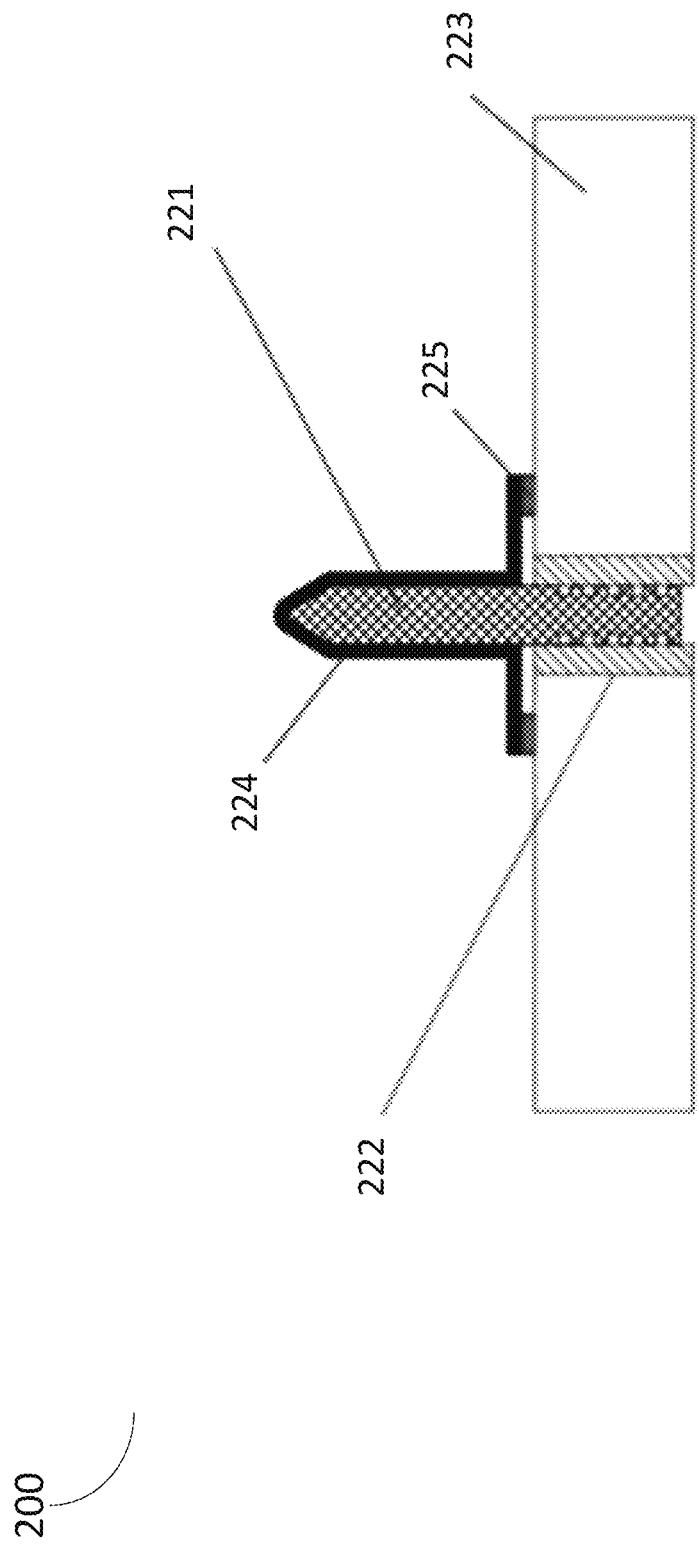
FIG. 2 is a schematic cross-sectional representation of an in-mold sealing system in accordance with the disclosed subject matter.

Referring now to FIG. 2, an in-mold sealing system 200 for sealing openings in a mold is shown in schematic cross-sectional view. Sealing system 200 includes at least a portion of a mold 223. Mold 223 may be at least a portion of a turbine blade mold configured for VARTM processes.

Mold 223 may have a mold surface such as mold surface 113 as shown in FIG. 1. Mold 223 may include a plurality of planes, contours, and angles complementary to one or more airfoils; the mold may have a greater thickness at one portion of the blade span (e.g. root) than at another portion of the blade span (e.g. tip). Mold 223 includes at least an opening disposed therein. For example and without limitation, the at least an opening may be a bushing hole 222. The size, shape, depth of the holes can vary along the blade span (and likewise the size, shape and length of the bushing/pin 221 can vary accordingly).

Bushing hole 222 may include one or more bosses. The one or more bosses may be at least a portion of a bolt, screw, pin, dowel, stud, or other hardware. The one or more bosses may be partially disposed within bushing hole 222. The one or more bosses may partially extended above mold 223 out of bushing hole 222. Bushing hole 222 may include a retractable pin configured to locate one or more other mating parts, such as a spar cap, foam core, etc. For example, the hole 222 can be located in the mold at a position that is adjacent to the edge of the spar cap and/or shear web, once inserted after the layups of composite panels are inserted. Bushing hole 222 may include precision pin 221. Precision pin 221 may be configured to be seated within an opening in a mating part, such as in the case of turbine blade VARTM molding. Use of mold-mounted precision pins to provide high accuracy layup references has attracted the attention of many VARTM operators. As discussed hereinabove, one of the many challenges that such a system may bring about is the issue of sealing the system. FIG. 2 depicts the installation of a non-stretchable seal system for retractable pin design.

With continued reference to FIG. 2, system 200 includes a diaphragm 224. diaphragm 224 includes an internal surface, the internal surface comprising a first complementary shape corresponding to the boss. Diaphragm 224 may be pre-molded to the shape of the hardware (shown as precision pin 221) it is configured to seal. Diaphragm 224 may be molded to adapt, e.g. stretch, upon installation, to have a complimentary shape of a portion of the hardware on which it is disposed and is configured to seal against resin ingress. For example and without limitation, precision pin 221 may be in complete contact with the diaphragm 224 (as shown in FIG. 2) or only a portion thereof, such as the distal end (pointed end, herein shown). For example and without limitation diaphragm 224 may be flexible/adaptable to include a shape that is complementary to a plurality of hardware, such as a plurality of sizes of the same type of pin, such as precision pin 221.

Figure 6:
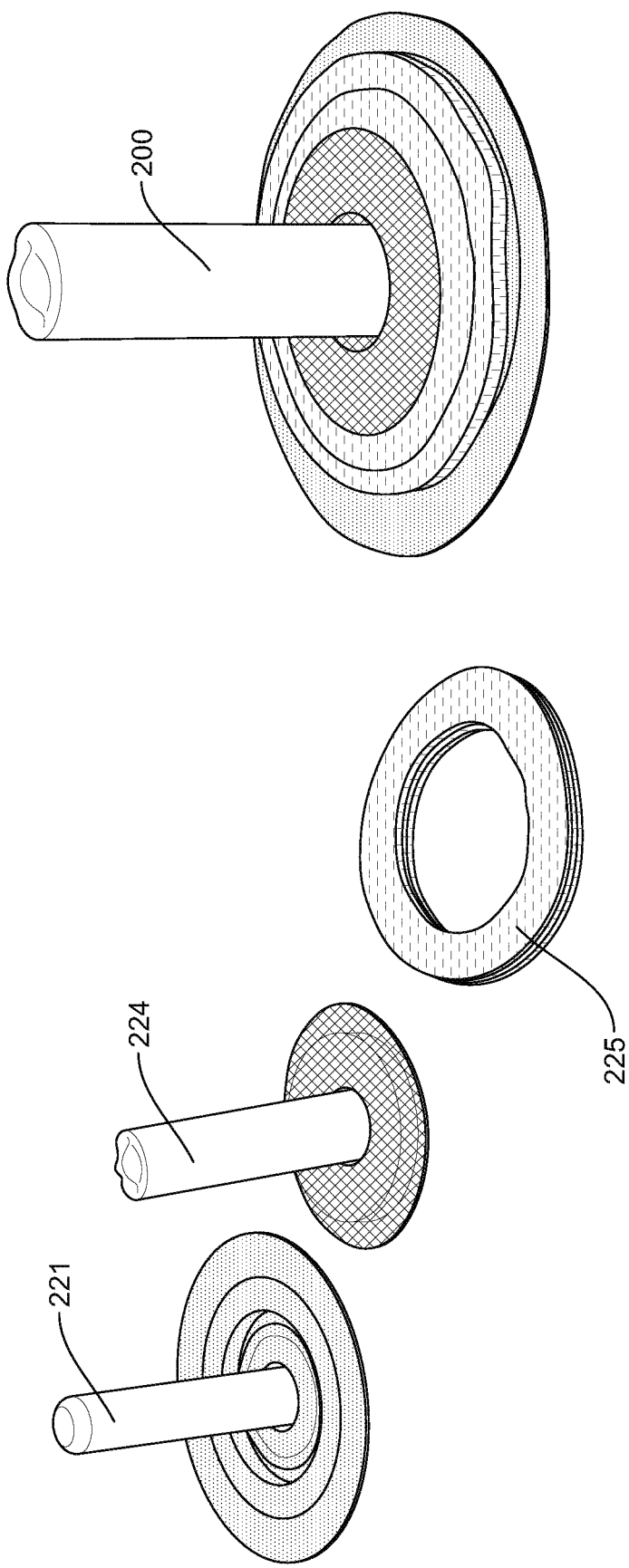
FIG. 6 is a photographic representation of an embodiment of an in-mold sealing system in a disassembled and assembled/installed configuration.

With continued reference to FIG. 2, diaphragm 224 includes a second complementary shape corresponding to the mold, herein shown as the portion of diaphragm that is disposed parallel to mold 223 that sits flush or substantially flush with mold 223. Diaphragm 224 includes a perimeter portion disposed on the second complementary shape corresponding to the mold surface, the perimeter portion proximate the mold surface and surrounding the opening. As shown in FIG. 6, the molded embodiment of diaphragm 224 shown as the substantially circular portion disposed perpendicular to the shaft portion (the complementary shape of pin). This portion of diaphragm 224 is disposed in a generally planar (flat, contourless) mold, yet this is only an example, the portion of mold the opening and pin are disposed may be in a contoured portion of the mold such that the pin extends out of the mold at an angle.

With continued reference to FIG. 2, diaphragm 224 may be formed from polyurethane. Diaphragm 224 may be formed from one or more types of plastic, thermoplastic, hard rubber, or other malleable material capable of forming a complementary shape of at least a portion of a boss, such as precision pin 221. Diaphragm 224 may be formed from one or more rigid and/or flexible foams. Diaphragm 224 may be formed from one or more polyesters such as polycaprolactone. diaphragm 224 may be formed from one or more of neoprene, chloroprene, silicone, nitrile, ethylene propylene diene monomer (EPDM), styrene-butadiene rubber (SBR), butyl rubber, fluorosilicone rubber, and the like, among others. diaphragm 224 may be treated after or during the manufacturing process to reduce or ensure non-reactivity with the one or more selected resin types utilized in VARTM.

With continued reference to FIG. 2, includes an adhesive gasket 225 disposed on the perimeter portion of diaphragm 224. The adhesive gasket 225 is configured to releasably fix the diaphragm 224 to the mold 223. Adhesive gasket 225 may be configured to adhere the diaphragm 224 to at least a portion of the mold, such as mold 223, which will be discussed in greater detail below. Adhesive gasket may be disposed at the outermost edge of diaphragm 224. For example, in some embodiments diaphragm 224 may have a circular pre-stretched shape, wherein the outermost edge of one side of the diaphragm 224 is fixed to a first side of adhesive gasket 225. Adhesive gasket 225 may comprise a torus shape, wherein the outer edge of adhesive gasket mirrors the outermost edge of diaphragm 224 and extends a distance toward the center of diaphragm 224, terminating in an inner circular planform shape with a radius smaller than the outermost edge. This is merely an example, and a plurality of adhesive gasket shapes may be utilized in system 200.

Adhesive gasket 225 is configured to sealably and releasably fix diaphragm 224 to mold 223 over an opening such as a bushing hole 222. Adhesive gasket 225 is configured to surround at least the opening of bushing hole 222 in mold 223. Adhesive gasket 225 may be configured to stick to the material of mold 223. Adhesive gasket 225 may be formed from double-sided tape, such as sticky tack tape. Adhesive gasket may be formed from one or more rubbers suitable for gaskets configured to seal against a liquid or viscous substance (such as resin) like any of the rubbers described herein above. Adhesive gasket 225 may be formed from a material configured to stretch with diaphragm 224. Adhesive gasket 225 may be formed from a material configure to resist stretching with diaphragm 224. Adhesive gasket 225 may be formed from a material that is conditionally adhesive, such as after the application of heat, pressure, or another condition. Adhesive gasket 225 may be conditionally adhesive such that it may be applied and removed repetitively or replaceably in one or more subsequent VARTM processes. Adhesive gasket 225 may be fixed to the perimeter portion of diaphragm 224. Adhesive gasket 225 may be formed from double-sided tape. The adhesive gasket 225 is configured to releasably fix the diaphragm 224 to a contoured surface of the mold. That is to say that the system 200 may be configured to be routinely removed and reapplied to mold 223 in one or more subsequent VARTM processes.

In some embodiments, adhesive gasket 225 may include an alignment feature disposed thereon. The alignment feature configured to align the in-mold sealing system 200 relative to the mold 223. In some embodiments, wherein the diaphragm 224 are shaped complementarily to a boss, such as precision pin 221, the diaphragm may only fit in a certain orientation relative to the precision pin 221. For example the adhesive gasket 225 may include a notch that aligns with a feature on the mold 223 configured to align adhesive gasket 225 and diaphragm 224 with precision pin 221. The alignment feature may be disposed jointly on the diaphragm 224 and/or adhesive gasket 225 configured to align the components together, as well as relative to mold 223, in embodiments. diaphragm 224 may include the one or more alignment features relative to the mold 223. Adhesive gasket 225 may be configured to removably fixed the diaphragm 224 to mold 223. For example and without limitation, adhesive gasket 225 may be configured to adhere diaphragm 224 to mold 223 prior to the resin infusion process of molding a component, after the setting/curing of said resin, the mold can be opened and the components removed. Then the diaphragm 224 and adhesive gasket 225 may be removed from mold 223 and reapplied to one or more other suitable locations in subsequent VARTM processes.

Figure 3:
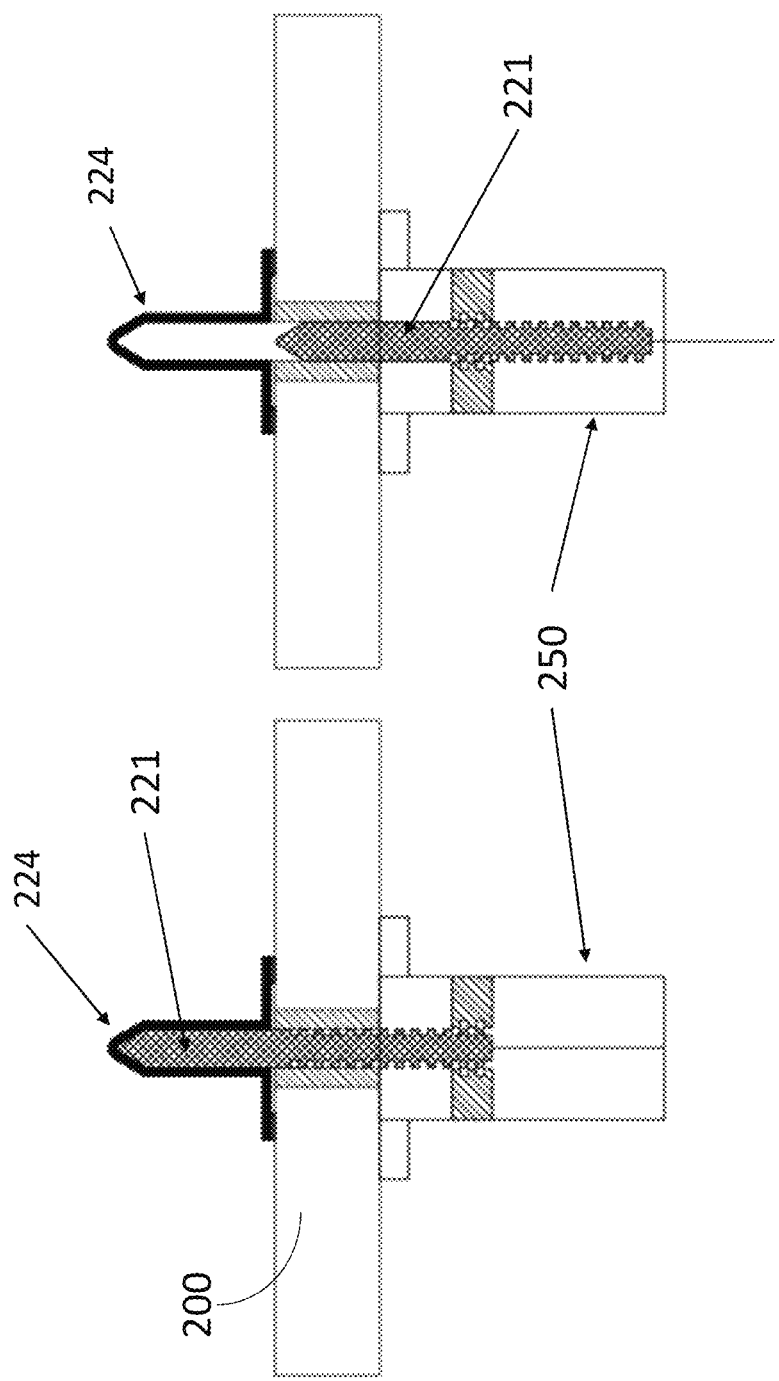
FIG. 3A-3B are schematic cross-sectional representations of the in-mold sealing system with retractable pin (a) extended, and (b) retracted in accordance with the disclosed subject matter.

Referring now to FIG. 3A-3B, a schematic cross-sectional view of the in-mold sealing system 200 is shown with a pin 221 in the (a) extended position and (b) retracted position—and with the membrane 224 disposed over the hole/pin in each view. In some embodiments, system 200 may be placed over an opening in the mold such as in FIG. 3B, wherein the opening contains the retracted pin 221 coupled to at least one actuator 250. The pin can then be extended up into the diaphragm, the covered pin now utilized as an alignment feature with one or more mating parts of the mold, such as locating a hole in another mold half closed over the mold in which the pin is disposed; and/or serve as a reference point for proper installation of a blade component, e.g. spar cap/shear web.

The diaphragm, whether stretchable as in flexible diaphragm 111 or molded like diaphragm 224 (shown in FIGS. 3A-3B), may include one or more outlets/vents for expulsion of air or produced gases during the insertion of any boss into diaphragm such that the air or gases do not cause ballooning or rupturing of said diaphragm. The outlets may be slots, holes, cuts, meshes, or other openings configured to let gases pass through but not resin or other viscous liquids or semi-liquids. Outlets may be disposed continuously throughout the diaphragm, in only a portion thereof, or in specific locations and patterns corresponding to the type of gases and method of expulsion. For example and without limitation, outlets may be disposed at the top most portion of the diaphragm so a pin may act as a plunger and expel the air at the end of the stroke of the pin expanding/extending upward into the volume defined by the membrane 224. For example and without limitation, outlets may be disposed at locations where the edges of hardware may be located, such as the edge of a hexagonal bolt head. One of skill in the art would appreciate these are merely examples and that a plurality of patterns and types of outlets may be employed for the purpose of expelling gases from inside the diaphragm. During layup, the extended pin (FIG. 3A) provides the hard stop for component placement. The assembly maintains this configuration during resin infusion and cure thereafter. The sealing systems 100, 200 prevents any air/resin ingress into the bushing hole. Finally, before demolding the part, the pin is retracted and the seal is removed with the part as it is leaving the tool.

Figure 4:
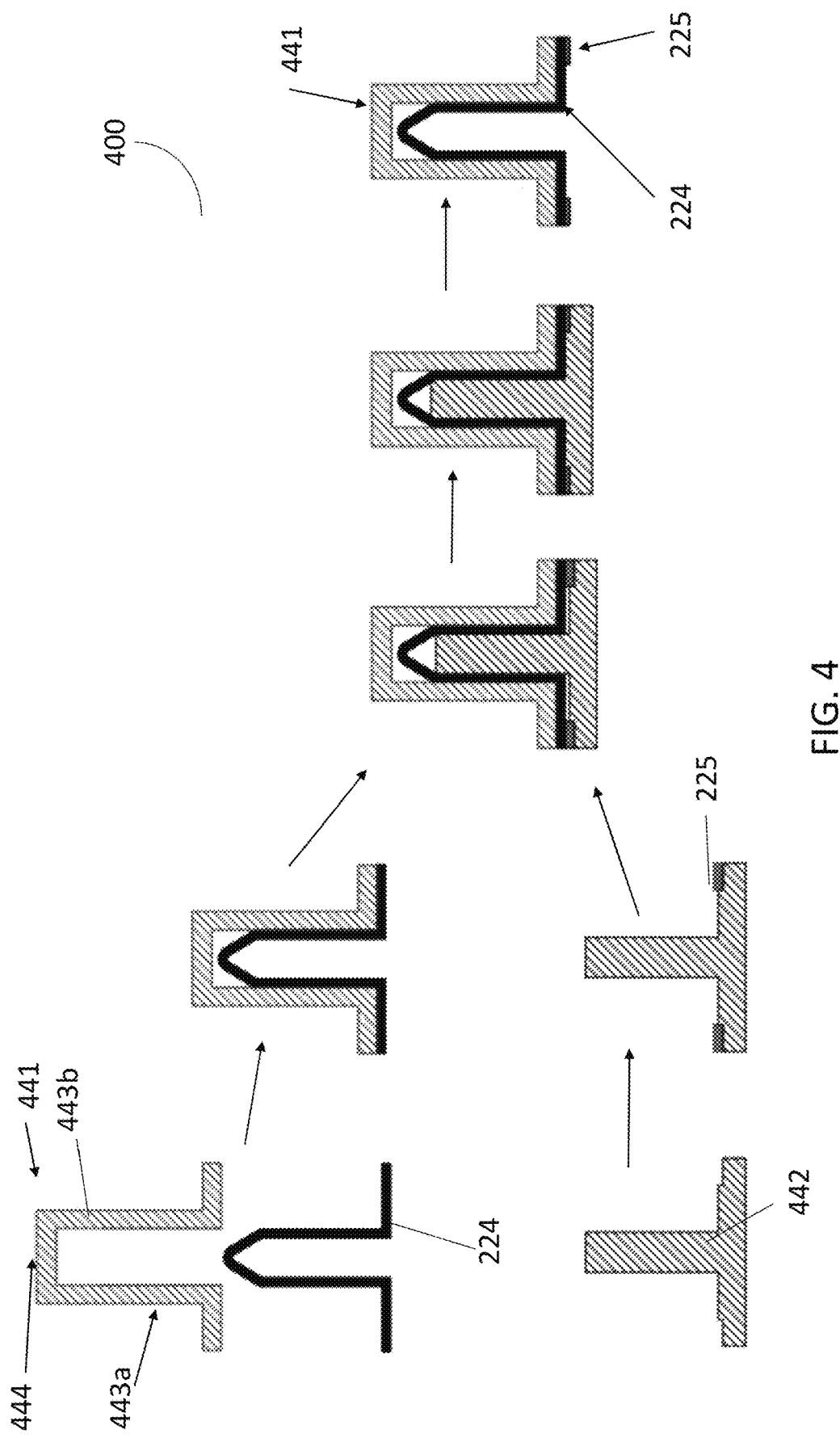
FIG. 4 is a plurality of schematic cross-sectional representations of assembly fixtures in accordance with the disclosed subject matter.

Referring now to FIG. 4, side schematic views of the assembly fixtures configured to align and support system 200 is shown. Fixture assembly 400 includes an outer fixture 441. Outer fixture 441 includes a pair of parallel legs 443a,b with an interconnecting top member 444 to define a cavity therein which is sized to receive the combination of the boss/pin 221 and diaphragm 224. In some embodiments, the diaphragm 221 contacts/abuts the planar sidewalls of legs 443a,b while the top member 444 is spaced from the distal end of diaphragm 224 and pin 221.

Outer fixture 441 is configured to slidably receive and attach to diaphragm 224. Outer fixture 441 may contact the exterior surface of the cylindrical portion of diaphragm 224. Outer fixture 441 may be configured for use with flexible diaphragm 111. Outer fixture 441 may be configured to support diaphragm 224 against abrasion before and during installation. Outer fixture 441 may be configured to remain on diaphragm 224 during the installation and molding process in order to protect the plastic of diaphragm 224. Outer fixture 441 may include a complementary shape to the outer mold line of diaphragm 224 as shown in FIG. 4. Outer fixture 441 may include a partially complementary shape to the outer mold like diaphragm 224 (i.e., the cylindrical lateral surface and not the conical distal end shape).

Fixture assembly 400 includes inner fixture 442. Inner fixture 442 is configured to be slidably inserted into diaphragm 224 internally and align diaphragm 224 with adhesive gasket 225 which is placed on the radially outer edge of inner fixture 442. In various embodiments, outer fixture 441 and inner fixture 442 may be matingly fixed together around (e.g. above, with respect to fixture 441; and below with respect to fixture 442) diaphragm 224 and adhesive gasket 225. In various embodiments, adhesive gasket 225 may sit in a radial notch on inner fixture 442.

In various embodiments, adhesive gasket 225 may be placed on inner fixture 442 without adhering to inner fixture 442. In various embodiments, adhesive gasket 225 may be placed on inner fixture 442 and adhered to inner fixture 442 until inner fixture 442 is removed so that the membrane 224 can be employed for installation on a mold. In various embodiments, inner fixture 442 may be inserted in diaphragm 224, thereby installing adhesive gasket 225 to the perimeter portion of diaphragm 224, the diaphragm/inner fixture assembly may then be inserted into outer fixture 441. In various embodiments, outer fixture 441 may be slidably fixed to diaphragm 224, the outer fixture/diaphragm assembly slidably fixed to inner fixture 442, thereby adhering adhesive gasket 225 to the perimeter portion of diaphragm 224. In various embodiments, inner fixture 442 may then be removed leaving the outer fixture 441 fixed to diaphragm 224 and adhesive gasket 225 is fixed to diaphragm 224. One of ordinary skill in the art would appreciate that outer and inner fixtures are configured for use with the profile shown in FIG. 4, but a plurality of fixtures may be utilized based on the selected boss hardware (i.e., stud, bolt, screw, pin, nail, dowel). In various embodiments, diaphragm 224 may be injection molded. In various embodiments, diaphragm 224 may be mass produced.

Figure 5:
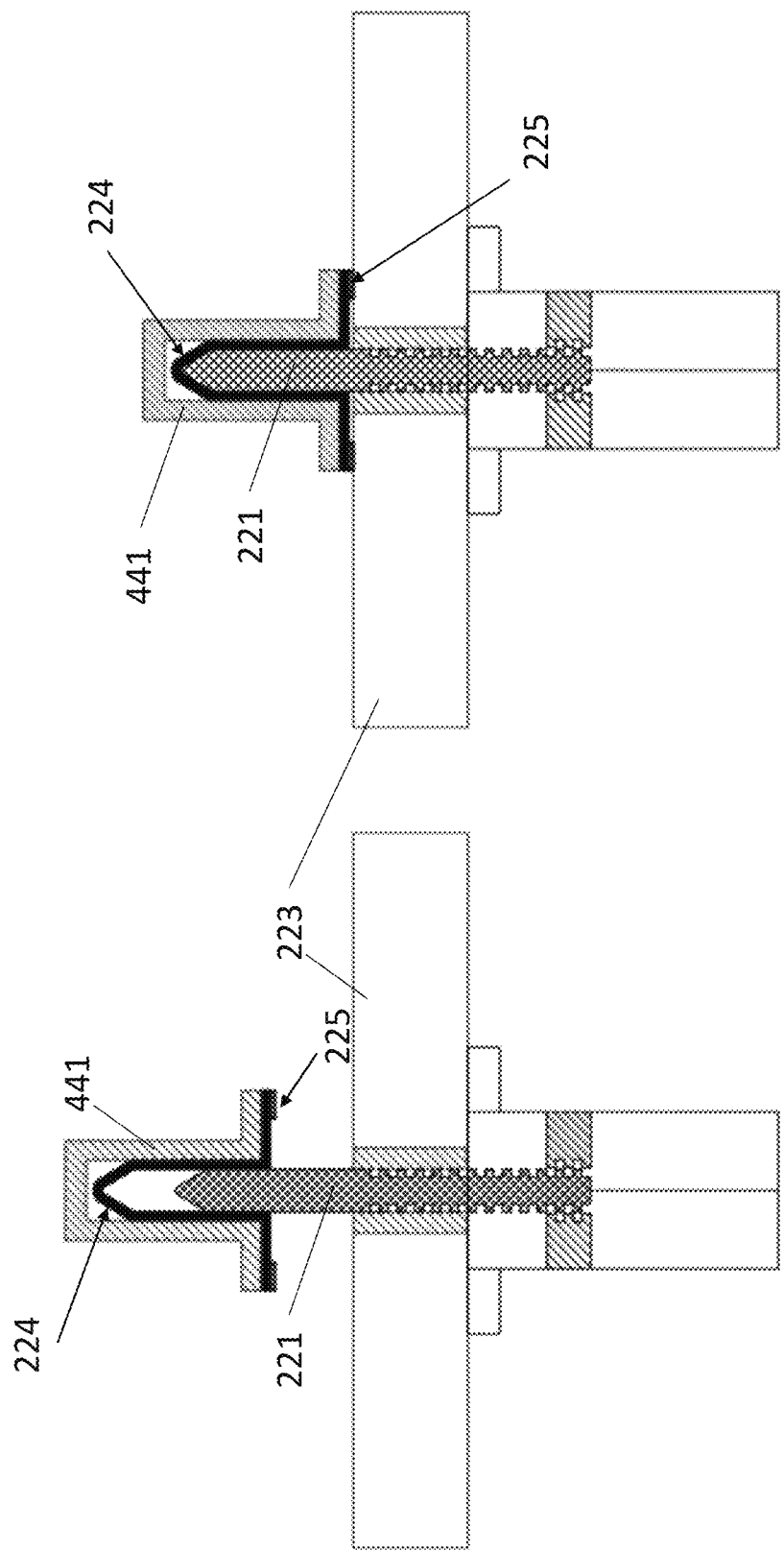
FIG. 5 is a schematic cross-sectional representation of the in-mold sealing system being placed on a retractable extended pin through an opening in a mold in accordance with the disclosed subject matter.

Referring now to FIG. 5, a final assembly of schematic cross-sectional representation of the in-mold sealing system being placed on a retractable extended pin 221 through an opening in a mold 223. In various embodiments, outer fixture 441 and diaphragm 224 are both, simultaneously, slid onto and fixed to an extended pin such as precision pin 221 such that the adhesive gasket 225 adheres to the mold surface surrounding the hole, thereby forming a seal with respect to the opening in mold 223. In various embodiments, outer fixture 441 and diaphragm 224 may be installed over the opening in the mold, wherein the pin is retracted within mold 223. The pin may be extended into the cavity of the diaphragm. In various embodiments, outer fixture such as outer fixture 441 may be fixed to the diaphragm during installation during the mold process to structurally support the diaphragm. Outer fixture 441 may be configured to prevent resin from entering the opening in the mold 223 in tandem with the diaphragm 224. In various embodiments, outer fixture 441 may be configured to mate with a corresponding feature in a mating mold part and/or locate layers in the layup process.

The actuator can drive the pin 221 up/down relative to the mold surface, with the exterior surface of the pin having a threaded structure to cooperate with a corresponding thread within the bore of the hole in the mold 223.

Referring now to FIG. 6, depictions of the systems described herein are represented. Precision pin 221 can be seen at the left hand most portion of the figure. Diaphragm 224 is shown immediately to the right hand in the same general shape as precision pin 221. Diaphragm 224 can be molded to the shape of precision pin 221, in various embodiments. Adhesive gasket 225 is shown immediate to the right of diaphragm 224. Adhesive gasket 225 is shown in a torus shape and configured to be fixed to the diaphragm 224, as can be seen in the right hand portion of the figure where the system 200 is installed over precision pin 221.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. An in-mold sealing system for sealing openings in a wind turbine blade mold, the system comprising:
a wind turbine blade mold having an interior surface configured to form a surface of the wind turbine blade, the interior surface of the mold having at least one opening therein,
at least one boss disposed within the at least one opening of the mold, the boss extending a distance beyond the interior surface of the mold;
a flexible diaphragm having opposing first and second surfaces, with the first surface facing the mold, the flexible diaphragm disposed over the opening in the mold surface; and
a gasket, the gasket having a first surface coupled to a perimeter portion of the flexible diaphragm, and a second surface coupled to the interior surface of the mold, wherein the gasket circumscribes the opening,
wherein the gasket comprises an alignment feature configured to align the in-mold sealing system relative to the mold surface.

2. The in-mold sealing system of claim 1, wherein the boss is at least a portion of a screw, bolt, bushing, stud, or pin.

3. The in-mold sealing system of claim 1, wherein the flexible diaphragm is formed from rubber.

4. The in-mold sealing system of claim 3, wherein the flexible diaphragm is formed from latex.

5. The in-mold sealing system of claim 1, wherein the gasket comprises a double-sided tape.

6. The in-mold sealing system of claim 1, wherein the gasket and diaphragm are removably coupled to the mold.

7. The in-mold sealing system of claim 1, wherein the gasket is configured to releasably couple the flexible diaphragm to a contoured interior surface of the mold.

8. The in-mold sealing system of claim 1, wherein the boss is a retractable pin, the retractable pin configured to be actuated in the at least one opening of the mold such that the retractable pin extends above the interior mold surface in an actuated state, and retracts below the interior mold surface in a retracted position.

9. The in-mold sealing system of claim 8, wherein the flexible diaphragm is configured to be placed over the opening in the mold in a first shape and deformed into a second shape when engaged by a retractable pin.

10. The in-mold sealing system of claim 9, wherein the system is configured to remain sealed against the mold surface during the retraction of the retractable pin, wherein the flexible diaphragm is configured to revert to the first shape from the second shape upon retraction of the pin.

11. An in-mold sealing system for sealing openings in a wind turbine blade mold, the system comprising:
a wind turbine blade mold having an interior surface configured to form a wind turbine blade skin, the interior surface having at least one opening therein,
a boss disposed within the at least one opening;
a diaphragm having:
an internal surface configured to extend over the at least one opening and engage at least a portion of the boss, and an external surface; and
a perimeter portion disposed at a radial edge of the diaphragm, the perimeter portion circumscribing the opening to form a seal between the diaphragm and interior mold surface;
a gasket, the gasket having a first surface coupled to a perimeter portion of the diaphragm, and a second surface configured to be coupled to the interior surface of the mold, wherein the gasket circumscribes the opening on the perimeter portion, the gasket configured to releaseably couple the diaphragm to the mold; and
an outer fixture, the outer fixture having a pair of parallel legs with a interconnecting top member to define a cavity therein, the outer fixture disposed over the external surface of the diaphragm and configured to receive the boss and diaphragm within the cavity,
wherein the gasket comprises an alignment feature configured to align the in-mold sealing system relative to the mold surface.

12. The in-mold sealing system of claim 11, wherein the boss is at least a portion of a screw, bolt, bushing, stud, or pin.

13. The in-mold sealing system of claim 12, wherein the boss is a retractable pin.

14. The in-mold sealing system of claim 11, wherein the diaphragm is formed from polyurethane.

15. The in-mold sealing system of claim 11, wherein the gasket is formed from a double-sided tape.

16. The in-mold sealing system of claim 11, wherein the diaphragm and gasket are removably fixed to the mold.

17. The in-mold sealing system of claim 11, wherein the in-mold sealing system is reusable in at least two VARTM processes.

18. The in-mold sealing system of claim 13, wherein the in-mold sealing system is disposed over the opening and configured to accept the retractable pin in an extended position.

19. The in-mold sealing system of claim 11, wherein the in-mold sealing system is configured to be resin-tight.

\* \* \* \* \*